United States Patent [19]

Tomita et al.

[11] Patent Number: 5,256,285
[45] Date of Patent: Oct. 26, 1993

[54] FILTER CONTAINER WITH DOUBLE CONSTRUCTION

[75] Inventors: Yoji Tomita, Shimotsuga; Eiichi Oishi, Sashima; Masanori Kobayashi, Sashima; Kimiyasu Onda, Sashima; Hiroshi Miyaji, Sashima, all of Japan

[73] Assignee: Kanebo, Ltd., Tokyo, Japan

[21] Appl. No.: 811,935

[22] Filed: Dec. 23, 1991

[30] Foreign Application Priority Data

Dec. 27, 1990 [JP] Japan .................................. 2-415252

[51] Int. Cl.⁵ ...................... B01D 27/10; B01D 27/08
[52] U.S. Cl. ..................................... 210/234; 210/238;
210/445; 210/450; 210/453; 210/455; 210/440;
210/443; 210/235
[58] Field of Search ............... 210/232, 235, 445, 450, 210/451, 453, 238, 234, 455, 443

[56] References Cited

U.S. PATENT DOCUMENTS

| | | | |
|---|---|---|---|
| 3,388,801 | 6/1968 | Boyd et al. | 210/234 |
| 3,502,214 | 3/1970 | Mills et al. | 210/235 |
| 3,608,726 | 9/1971 | Crowther | 210/234 |
| 3,628,662 | 12/1971 | Kudlaty | 210/234 |
| 3,747,761 | 7/1973 | Heinrich, Jr. | 210/235 |
| 4,052,317 | 10/1977 | Palnik | 210/450 |
| 4,082,673 | 4/1978 | Cilento | 210/234 |
| 4,319,997 | 3/1982 | Pett | 210/450 |
| 4,331,535 | 5/1982 | Pett | 210/450 |
| 4,456,061 | 6/1984 | Swift, Jr. et al. | 210/232 |
| 4,522,717 | 6/1985 | Brust | 210/450 |
| 4,529,512 | 7/1985 | Williamson et al. | 210/136 |
| 4,529,514 | 7/1985 | Gruett | 210/235 |
| 4,559,136 | 12/1985 | Dockery | 210/235 |
| 4,574,048 | 3/1986 | van den Broek | 210/136 |
| 4,615,812 | 10/1986 | Darling | |
| 4,818,397 | 4/1989 | Joy | 210/234 |
| 4,882,051 | 11/1989 | Itoh | |
| 5,026,478 | 6/1991 | Tanabe et al. | 210/232 |
| 5,028,327 | 7/1991 | Ostreicher et al. | 210/232 |
| 5,066,391 | 11/1991 | Faria | 210/453 |
| 5,069,786 | 12/1991 | Pulek | 210/232 |
| 5,092,993 | 3/1992 | Goodwin | 210/232 |

FOREIGN PATENT DOCUMENTS

3806208A1 9/1989 Fed. Rep. of Germany .
WO89/03432 5/1988 PCT Int'l Appl. .
1389598 4/1975 United Kingdom .

Primary Examiner—Stanley S. Silverman
Assistant Examiner—Cynthia L. Nessler
Attorney, Agent, or Firm—Wenderoth, Lind & Ponack

[57] ABSTRACT

A filter container includes a sheet having a base with a liquid inlet pipe and a liquid exhaust pipe and a cap that is integrally attached to the base. A disposable unit container is housed inside the sheet, and the disposable unit container contains cartridge filters. The disposable unit container has a liquid inlet port and a liquid outlet port at a bottom portion thereof, these ports being provided with shut-off valves on the inside of the disposable unit container. The shut-off valves are engagable by the inlet and exhaust pipes on the base of the sheet so that the valves are open by engaging the disposable unit container with the base with the sheet, and are closed by removing the unit container from the base. The bottom end cap supports the lower ends of the cartridge filters above the inlet and outlet ports, and defines the inlet and outlet liquid flow paths. Upper end caps are also provided for sealing the upper ends of the cartridge filters.

24 Claims, 19 Drawing Sheets

FILTER CONTAINER WITH DOUBLE CONSTRUCTION

BACKGROUND OF THE INVENTION

1. Field of the Invention

This invention relates to the form of a filter container with double construction for containing cartridge filters incorporated in a factory line for removing foreign particles mixed in liquid, and to the construction of a disposable unit container which integrally contains filtering material.

2. Description of the Related Prior Art

For the filtration of liquid such as paint or ink, there has generally been used a container containing one or more cylindrical cartridge filters and connected to the piping of the liquid to be cleaned. The liquid is forced to flow from the outside of the filter toward the inside thereof so that foreign particles or agglomerated particles are trapped. The accuracy of or the number of stages in the filtration is determined depending on the required level of the filtration. Therefore, in the manufacturing line of a plant, the combination of type and number of the cartridge filters in a unit container is varied in accordance with the object of the filtering and the necessary amount of the flow.

Since paint often includes hazardous pigments or organic solvents which are flammable and have an irritating odor, the housing has to be a sealed container which can withstand filtration pressure without leakage of the contents. If used for an extended period of time, filters may be clogged increasing the internal pressure in the housing to the control limit pressure, and necessitating replacement of the cartridge filters inside.

However, the factory line cannot be suspended for long merely for the replacement of filters. There has been proposed, as is disclosed in Japanese Utility Model Application Laid-open No. 37690/1989, a disposable filter container. It is not quite satisfactory from an economical standpoint to dispose of the container with mechanical intensity. With an aim toward eliminating the trouble of cleaning the inside of the housing at the time of the filter replacement operation, Japanese Utility Model Application Laid-open Nos. 163514/1989 and 174007/1989 propose enveloping the filters with a film during use that can be discarded after use together with the film, but this is not quite satisfactory, as there remain problems such as leakage of the liquid at the time of replacement and the mechanical intensity thereof.

The unit containers are consumables, and should be changed for new containers when one life thereof is completed. Since the unit containers are disposable as described above, the material thereof is generally a molded resin such as polypropylene or polyethylene. In this connection, there are problems such as size, accuracy and stability of the shape, and leakage of the liquid occurs easily due to the these problems.

In a manufacturing line for paint or ink, or a refining or conveyor line for fuel oil, a filter container containing one or more cartridge filters is connected to the line in order to trap and filter foreign particles or agglomerated particles mixed in the liquid. The accuracy of the filters and/or the number of stages of filtering are determined by the required level of the filtration.

Since the liquid to be filtered often includes toxic and hazardous organic solvents, the container (housing) for cartridge filters should be a pressure-resistant sealed container which withstands filtration pressure and which does not leak its contents. Moreover, the cartridge filters (filtering material) should be replaced with new ones if and when they have caught a certain amount of the foreign particles and their tissues are clogged and suspend the flow of the liquid. The replacement operation is usually conducted by suspending the production or conveyor line of the plant.

As mentioned above, the manufacturing line must be suspended to replace the filtering material, various inconveniences are caused, and countermeasures to solve the problems have long been sought. More particularly, when the manufacturing line is suspended at a plant for a liquid which contains highly viscous and polymeric substances such as paint and ink, the liquid is subjected to changes in its flowability when the residence time is too long. This will cause agglomeration of the liquid or changes in the product quality. Further, the replacement work itself is extremely dirty, cumbersome and heavy. Organic solvents, when evaporated, may cause hazards to the health of the operators, which is one of the reasons why it is difficult to keep young workers at jobs in the industry.

The above problem may be solved if an additional line is provided in parallel to the main manufacturing line so as to continue the production while replacing the filtering material in the main line. However, this requires additional equipment as well as additional space, and the measure would not solve the problem completely, because it is not effective in solving the second problem. As a means to solve the latter problem, Japanese Utility Model Application Laid-open No. 37690/1989 proposes disposable housings. However, it is not desirable from an economic standpoint to throw away structurally pressure-resistant housing.

SUMMARY OF THE INVENTION

This invention was conceived to eliminate the above problems encountered in the prior art and aims to provide a filter container which can prevent leakage of the liquid at the time of filter replacement and which can be replaced in a safe, clean and rapid manner.

The second object of this invention is to provide a disposable unit container for a filter housing with double construction which is adaptable to diverse filtering conditions, lessens the burden of inventory management, and securely holds the cartridge filters.

The third object of this invention is to provide a filter container with double construction comprising a unit container which can be easily mounted or dismounted and which can absorb dimensional changes of the filtering material.

According to one aspect of this invention, for achieving the objects described above, there is provided a filter container with double construction which comprises a sheath member and a disposable unit container housed in the sheath member. The sheath member comprises a base directly connectable to the piping of a line and caps, the base and the sheath member being integrable by attaching the caps to said base. The unit container internally houses predetermined cartridge filters and has a liquid inlet port and a liquid outlet port that are respectively engaged with a liquid inlet pipe and a liquid exhaust pipe provided on the base. The liquid inlet port and the liquid outlet port are provided with respective shut-off valves, and a flow path is opened by fitting the unit container on the base and closed by detaching the unit container from the base.

According to another aspect of this invention, there is provided a filter container with double construction which comprises a sheath member having a pressure resistant and durable structure and a disposable unit container housed in the sheath member which contains one or more cartridge filters. The unit container includes, as replaceable component parts, one or more upper end caps having ring-like sealing edges for sealing end faces of the cartridge filters, and a bottom end cap having a cylindrical cartridge stopper which fits into inner holes of the cartridge filters at the end. The cartridge filters are fixed within the unit container by being held between the upper end cap and the bottom end cap at the top and the bottom thereof.

Further, according to still another aspect of this invention, there is provided a filter container with double construction which comprises a sheath member having a durable and pressure-resistant construction and a disposable unit container concentrically housed in the sheath member and containing one or more cartridge filters. The unit container comprises a disc-like base member having a liquid inlet port. A liquid outlet port and shut-off valves to close the respective ports a cylindrical body member houses the cartridge filters. The body member has a diameter smaller than the diameter of the ports, except for the lower end, which is reverse-tapered to form a conical shoulder portion having at least one inclining angle and joined with the base member. The cartridge filters are separately and independently supported at upper ends thereof.

The nature, principle and utility of the invention will become more apparent from the following detailed description when read in conjunction with the accompanying drawings.

DESCRIPTION OF THE PREFERRED EMBODIMENTS

Figure 1:
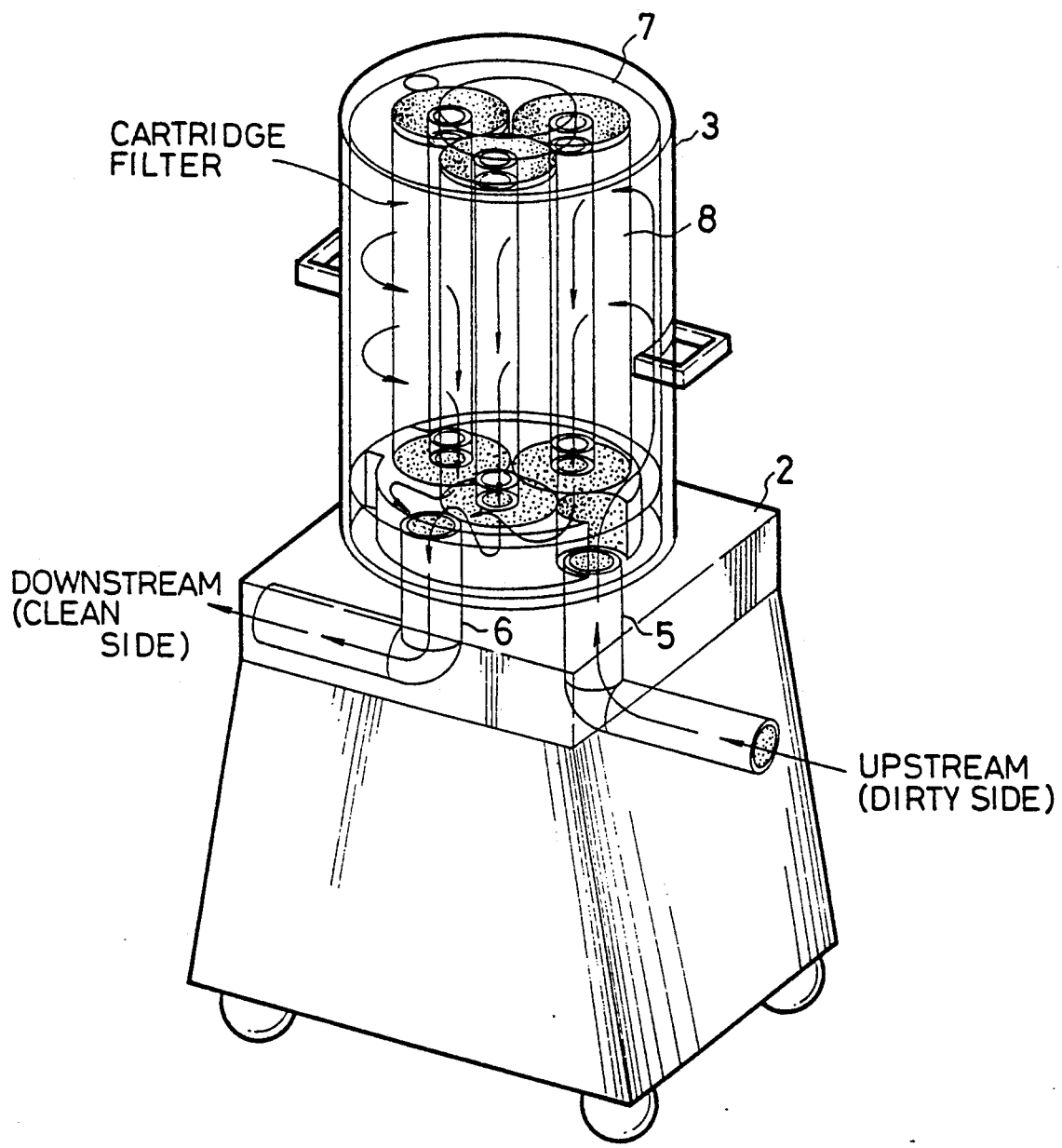
FIG. 1 is a conceptual view of this invention.
Figure 2:
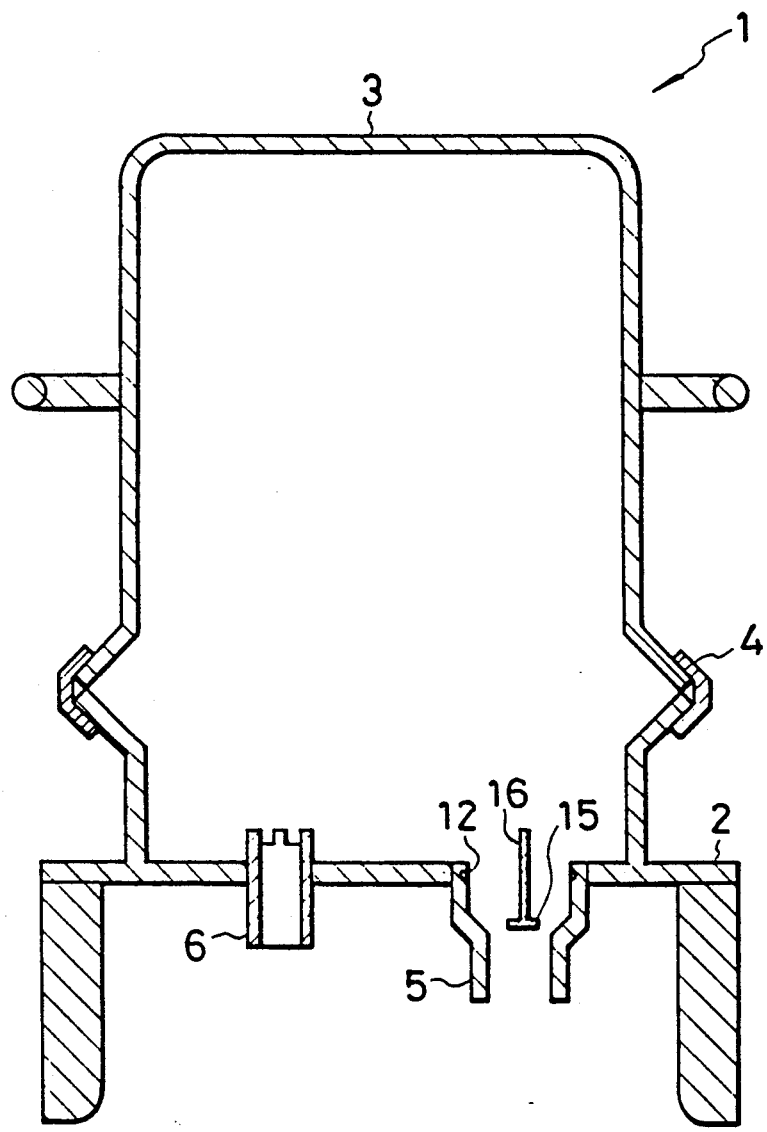
FIG. 2 is a vertical section showing a sheath member.

FIG. 1 is a conceptual view of this invention, and FIG. 2 is a vertical sectional view showing an embodiment of a sheath member 1 of a filter container with double construction according to this invention. The sheath 1 is divided into a base 2 and a cap 3, which are integrally coupled with a band coupling 4. The base 2 is provided with a liquid inlet pipe 5 and a liquid exhaust pipe 6. The pipes 5 and 6 are connected directly with lines (not shown) in the cleaning process of the factory. The cap 3 preferably has an integral construction made of metal, as it needs to support a unit container inside thereof and to have sufficient mechanical strength so as not to be deformed or damaged by internal pressure. FIG. 1 shows the filter container having three cartridge filters 8 in the cap 3. The original liquid (upstream side) supplied to the liquid inlet pipe 5 is filtered by the cartridge filters 8, and then the cleaned liquid (downstream side) is exhausted through the liquid exhaust pipe 6.

Figure 3:
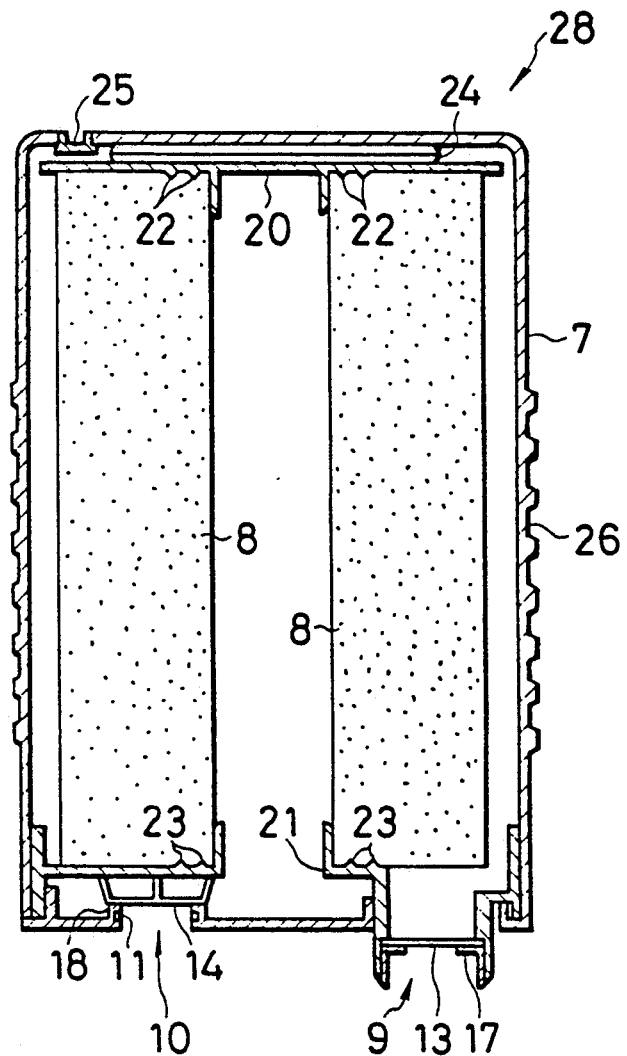
FIG. 3 is a vertical section showing an embodiment of a unit container.
Figure 4:
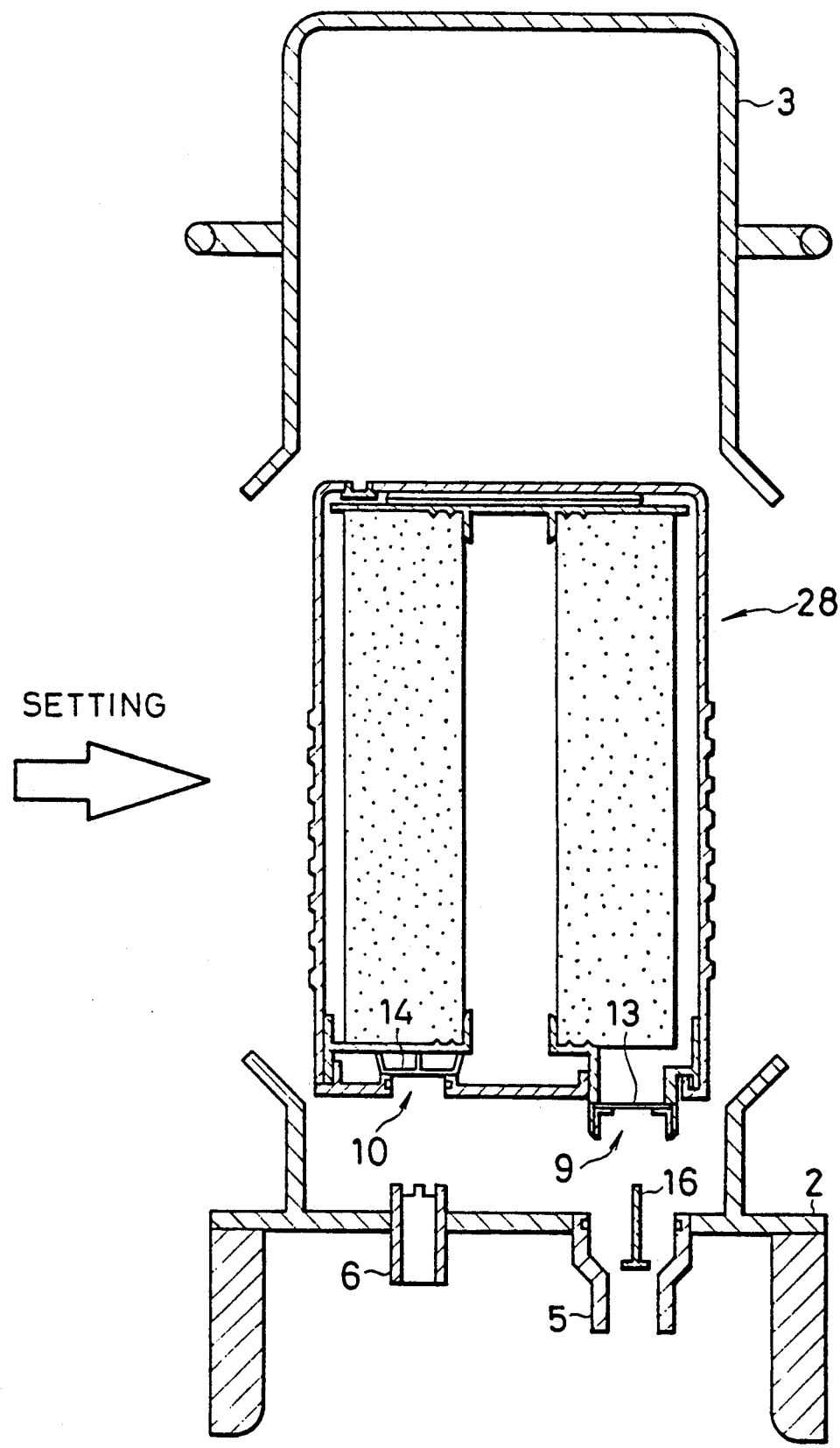
FIG. 4 is an explanatory view showing the assembly of the filter container according to this invention.
Figure 5:
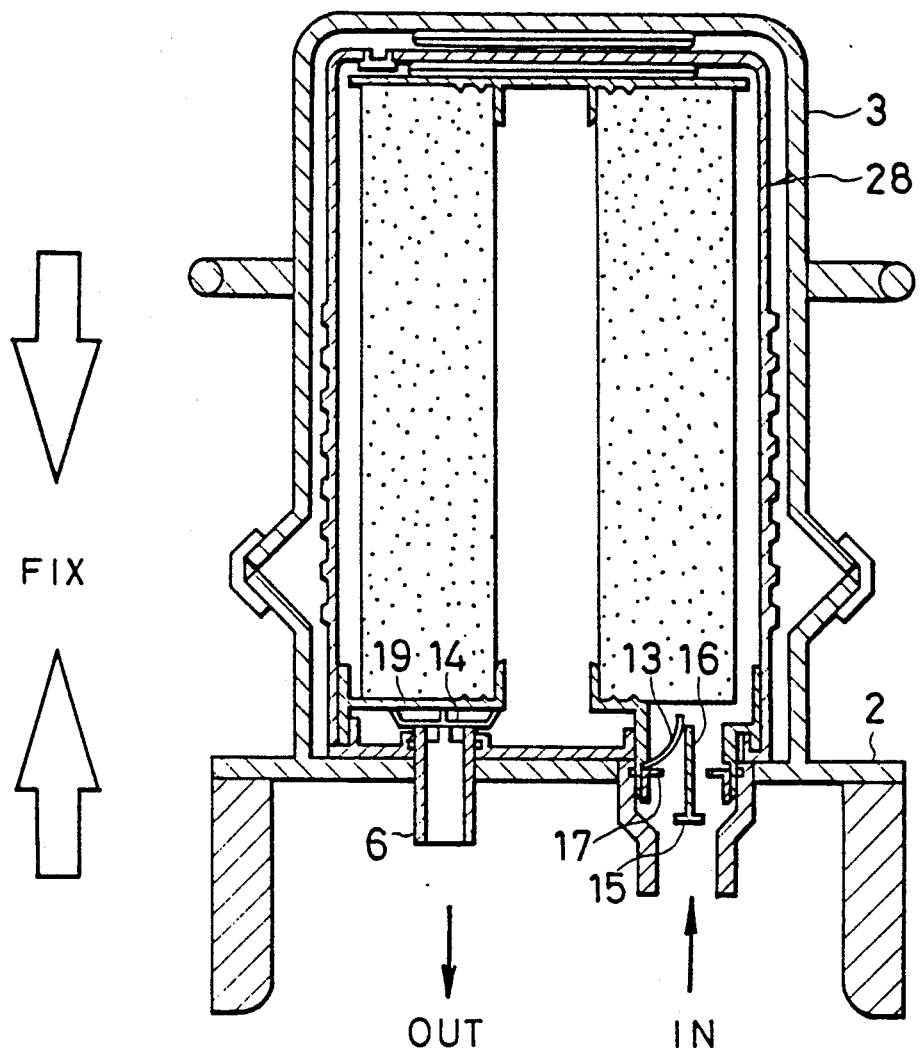
FIG. 5 is a vertical section of an assembled filter container according to this invention.
Figure 6:
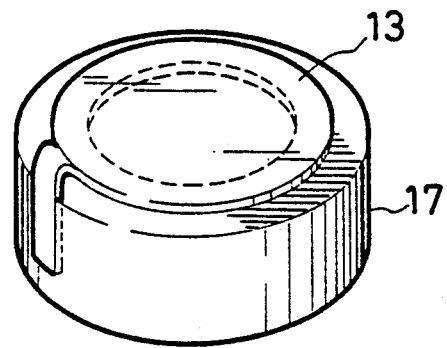
FIG. 6 is a perspective view showing a shut-off valve at a liquid inlet port.

FIG. 3 is a vertical sectional view showing an embodiment of a unit container, wherein a body 7 houses one cartridge filter 8 and has a liquid inlet port 9 and a liquid outlet port 10, which are respectively fitted with the liquid inlet pipe 5 and the liquid exhaust pipe 6 of the base 2. O-rings 11 and 12 are provided for coupling to prevent liquid leakage. Shut-off valves 13 and 14 are provided at the liquid inlet port 9 and the liquid outlet port 10. The shut-off valve 13 is supported on a supporting frame 17 so as to close a central hole of the liquid inlet port 9, and is partly fixed with the wall surface of the central hole and is partly left free. This way, the shut-off valve 13 is constantly applied with a force in crossing direction of the central hole. The liquid inlet pipe 5 of the base 2 supports at the neck portion thereof a bar-like projection 16 of a plate member 15. As shown in FIGS. 4 and 5, the bar-like projection 16 pushes up the shut-off valve 13 when a unit container 28 is placed and set, to thereby form a flow path for the liquid. When the unit container 28 is detached from the base 2, the bar-like projection 16 is pulled out and the shut-off valve 13 returns to the position abutting the supporting frame 17 to thereby close the liquid inlet port 9. The means of realizing the direction and resilience of the shut-off valve 13 is not limited specifically, but is preferably a plastic molding as shown in FIG. 6 in view of convenience of disposal or incineration.

Figure 7:
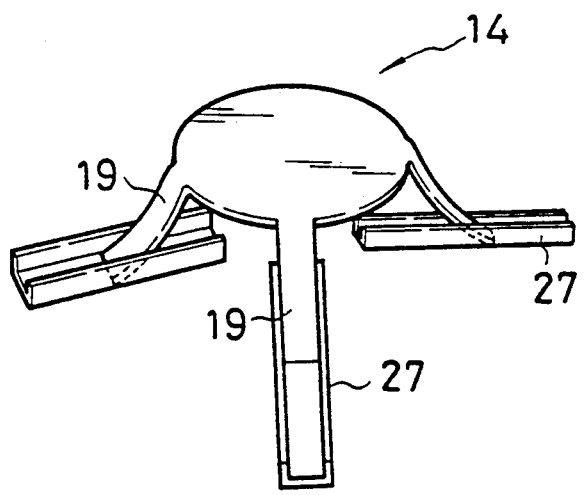
FIG. 7 is a perspective view showing a shut-off valve at a liquid outlet port.

FIG. 7 shows another embodiment of the shut-off valve 14 according to this invention, and is a molded plastic member. In FIG. 3, the shut-off valve 14 is placed and supported on the shoulder 18 to close the hole of the liquid outlet port 10. Plural legs (preferably three or four) 19 are attached on the periphery of a disc-like valve body. The legs 19 are respectively energized and directed to return to the original angle with impact resilience when the valve is pushed up and opened, and to slide along guides 27 on a bottom end cap 21. The upper edge of the liquid exhaust pipe 6 on the side of the base 2 is serrated or in the form of a gear. When the unit container 28 is set on the base 2 to push the shut-off valve 14 with the serrated upper edge, the liquid inside the container is exhausted through a recess section at the upper end of the liquid exhaust pipe 6 as shown in FIG. 5. When the unit container 28 is to be detached from the base 2, the liquid exhaust pipe 6 is pulled out from the liquid outlet port 10 and the legs 19 assume the original angle to close the liquid outlet port 10.

When the detached unit container 28 is being transported, even if it is hung by a foldable handle (not shown) provided on the top of the body 7, with the liquid inlet port 9 and the liquid outlet port 10 facing downward, and even if some liquid still remains inside, there is no leakage of the liquid to contaminate the surrounding floor, because the spring effect of the shut-off valves 13 and 14, in addition to the weight of the liquid, will enhance the sealing of the valves.

The cartridge filter 8 is set inside the unit container 28, and the liquid which is guided through the liquid inlet pipe 5 and the liquid inlet port 9 is led to the outside of the cartridge filter 8, and forced into and through the filters, during which process the liquid is cleaned. Therefore, it is necessary to provide a structure which can prevent the liquid outside the filters from coming inside through a bypass on both end faces. According to this invention, formation of the bypass is prevented by holding the top and the bottom ends of the filters with the upper end cap 20 and the bottom end cap 21 and sealing them with a cushioning member 24, as well as by providing ring-like projections 22 and 23, respectively, on the respective end caps 20 and 21.

The unit container 28 is of a disposable type and includes an injection molded member made of polyethylene or polypropylene. Since the unit container 28 relies solely on sheath 1 for the strength and form to withstand the internal pressure, the sheath 1 should be made of metal and should have pressure resistance.

To attach the unit container 28 to the base 2, the unit container 28 is first positioned, pressed firmly on the base 2, and then fixed therewith by the cap 3 via the cushioning member 24. Fixing may be achieved by such means as a screw, a ring belt or a clamp which ensures fixing. When they are fixed together, it is ready to be used. Valves of the process line are opened to introduce the liquid and start the filtration operation. To replace the filters, the flow from the line is suspended, and the liquid is returned to the line, if necessary, by blowing air and the like, and then the cap 3 is detached from the base 2. The unit container 28 is removed either by holding it on a lateral groove 26 provided on the side of the body 7 or by pulling it upward with a foldable handle provided on the top of the body 7. Then, a new unit container is attached, and after taking the same procedure, the operation is resumed. The used unit container is discarded. If the liquid in question is expensive, a stop (faucet) 25 provided on the top of the body 7 for exhausting the liquid may by pushed open from the outside to recover the liquid in a receptacle.

As disposable filters are consumable, the factory or the like should stock spare filters. As the diameters and the required number of the cartridge filters vary depending on the filtration conditions, the factory or the like sometimes is required to stock a large number of the cartridge filters in numerous types. The unit container according to this invention can deal with such variation in the filtration conditions simply by changing the end caps that hold the cartridge filters, as these caps are made detachable. In other words, by simply changing the end caps, the unit container can be adapted to house one cartridge filter with a large diameter or three standard type cartridge filter with a small diameter. This invention therefore reduces the amount of necessary stock.

Figure 8:
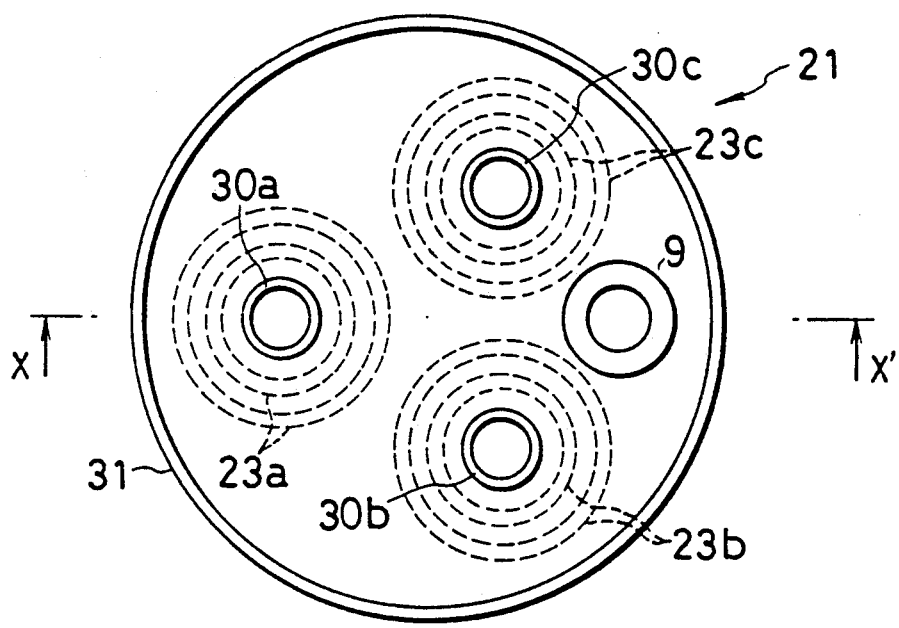
FIG. 8 is a plan view showing a bottom end cap.
Figure 9:
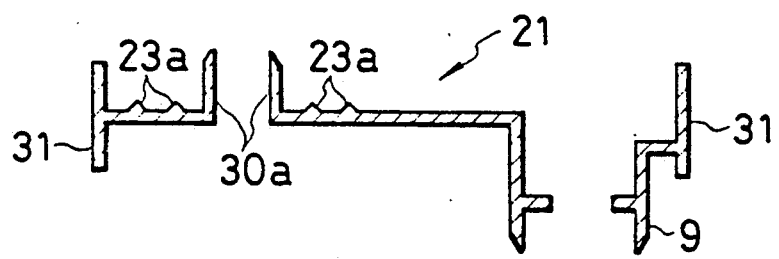
FIG. 9 is a cross section along the line X—X' of the bottom end cap of FIG. 8.
Figure 10:
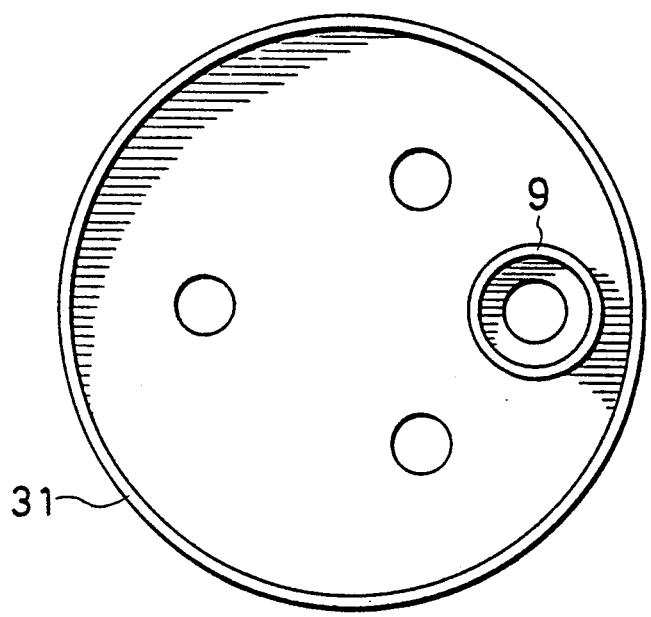
FIG. 10 is a bottom view showing the bottom end cap.
Figure 11:
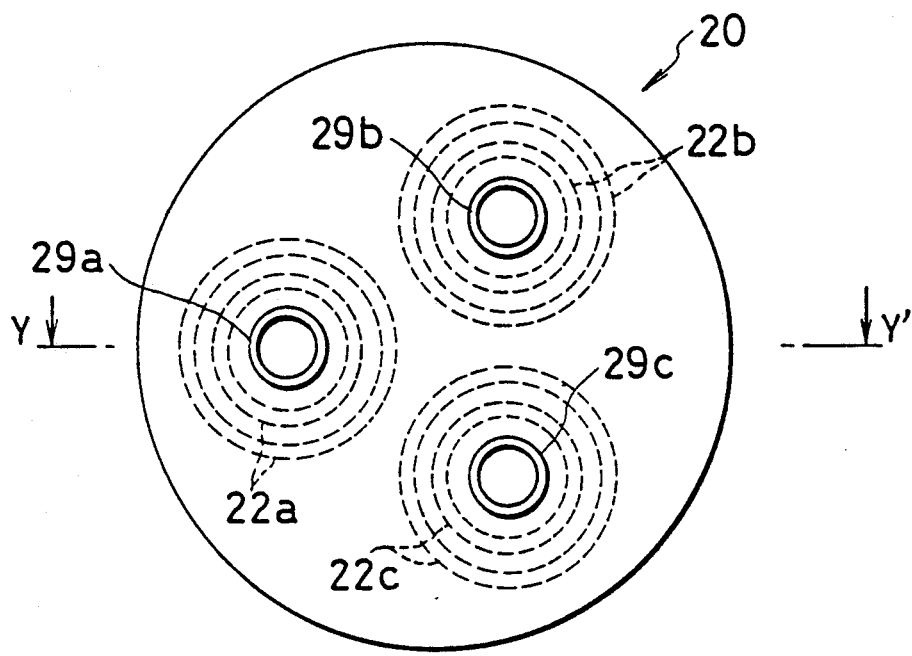
FIG. 11 is a bottom view showing the upper end cap.
Figure 12:
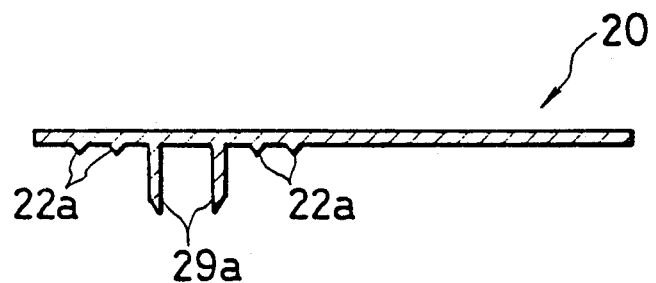
FIG. 12 is a cross sectional view along line Y—Y' of the upper end cap of FIG. 11.

Description will now be given to the end cap used for housing three cartridge filters referring to an embodiment. FIGS. 8, 9 and 10 are respectively a plan view, a cross section along the line X—X' and a bottom view of a bottom end cap 21. FIGS. 11 and 12 are a bottom view of an upper end cap and a cross section along the line Y—Y' 20, respectively. The upper end cap 20 and the bottom end cap 21 are provided, respectively, with three cartridge stoppers 29a, 29b and 29c and 30a, 30b and 30c. The inner holes each of the cartridge filters are fitted with the cartridge stoppers 29a to 29c and 30a to 30c and held from the top and the bottom. Ring-like projections 22a, 22b, 22c, 23a, 23b and 23c are provided around each stopper to prevent bypass of the liquid. The bottom end cap 21 is provided with an outer wall 31 in the form of a ring, which is fit in the body 7 of the unit container 28 in order to firmly fix the cartridge filter. It acts to position the cartridge filters.

The double construction filter container according to this invention is simple in handling and not time-consuming, as the disposable unit container thereof includes a filtration passage, and since the inside of the sheath portion or the portion of the container which is not disposable is never exposed to the liquid, eliminating the need to be cleansed at the time of replacement. If a plurality of filtration lines is provided in parallel to each other and used alternately at the time of the replacement, it is not necessary to suspend the line at all to thereby reduce the manufacturing cost. The unit container per se is free from contamination by the liquid on the outside thereof. The filter container of this invention may be removed and transported while containing the liquid and filters sealed inside without a fear of contaminating the surroundings. Moreover, since all the component members of the filter container of this may be made of molded plastics, they are easily incinerated or disposed of.

Figure 13:
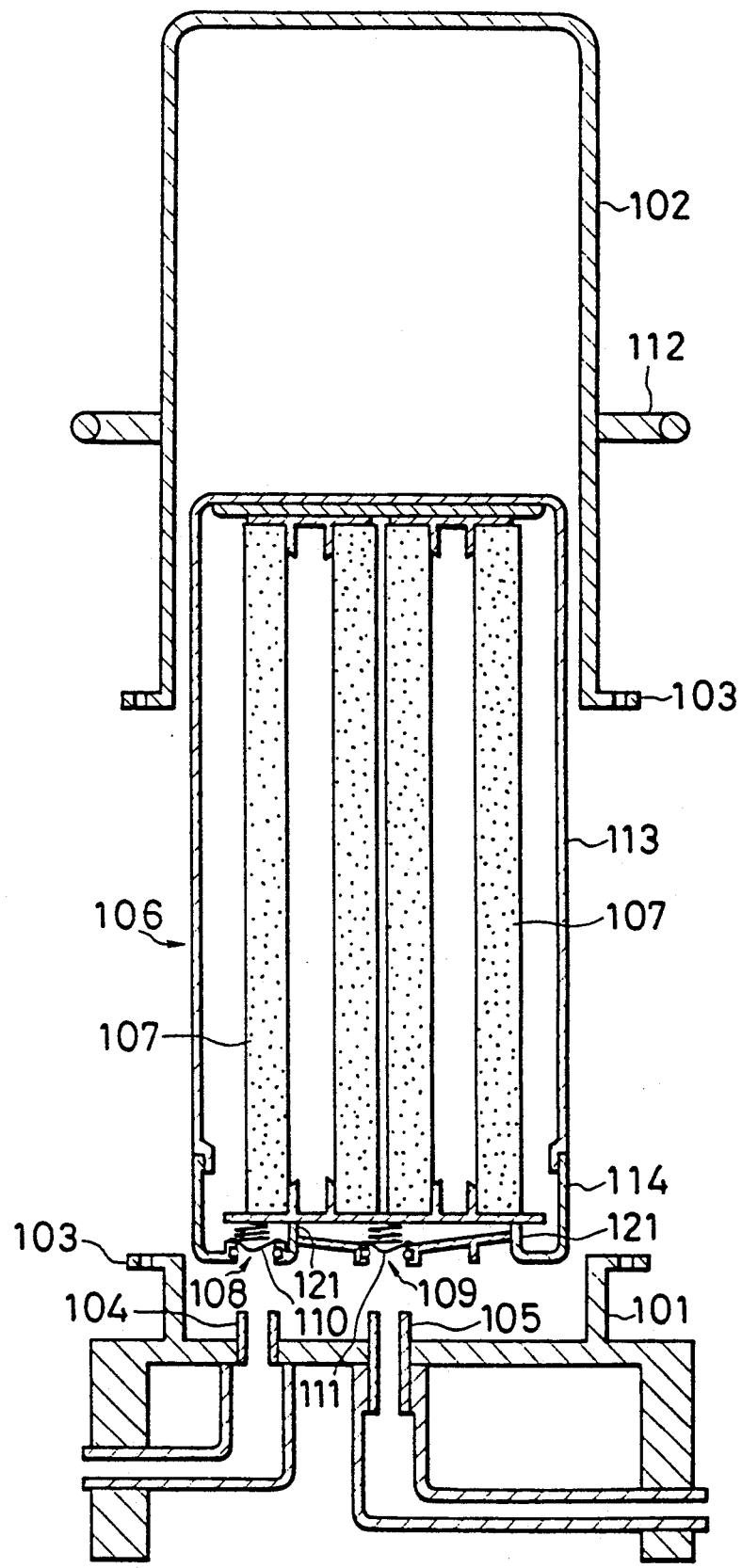
FIG. 13 is a view explaining the assembly of another filter container with double construction according to this invention.
Figure 14:
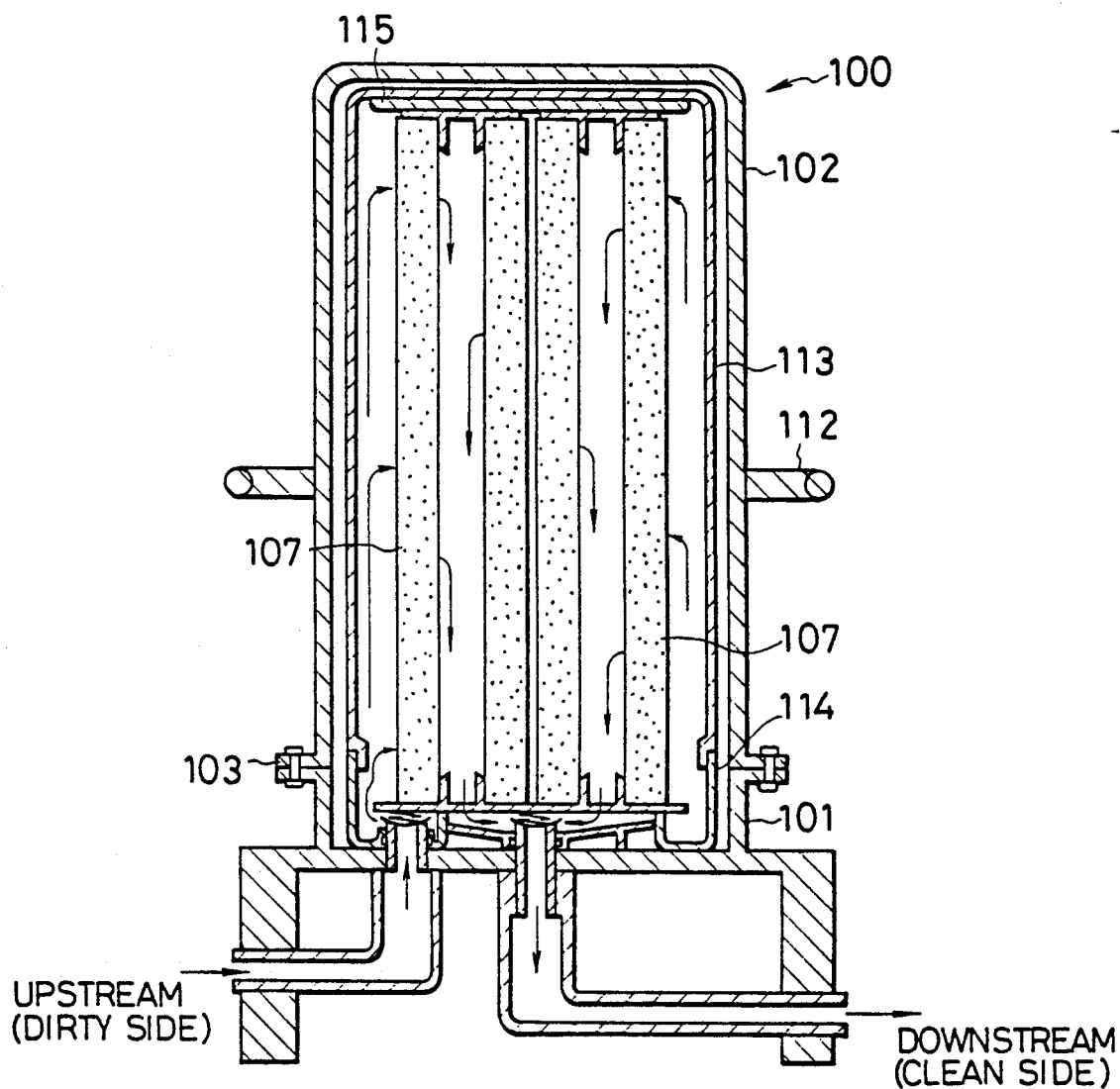
FIG. 14 is a vertical sectional view showing the assembled filter container with double construction of FIG. 13.

Another embodiment of this invention will now be described in more detail referring to the attached drawings. FIG. 13 is a view to explaining the assembly of a filter container 100 with double construction, and FIG. 14 is a vertical section showing the filter container 100 when assembled. A metal sheath member of pressure resistant structure for permanent use comprises a base 101 and a cap portion 102, which are integrally connected by a coupling means such as a flange 103, a screw or a clamp. A handle 112 is provided on a side of the cap portion 102 for convenience of transportation. The base 101 is provided with a liquid inlet pipe 104 and a liquid exhaust pipe 105, which are directly connected at their outward ends to a filtration process line of a plant (not shown). A unit container 106 houses cartridge filters 107, has at the bottom thereof a liquid inlet port 108 and a liquid outlet port 109, and includes shut-off valves 110 and 111 for closing the respective holes via elastic operation due to springs 110A and 111A from inside when the unit container 106 is not mounted as shown in FIG. 14. For assembling, the cap portion 102 is first detached from the base 101, and the liquid inlet port 108 and the liquid outlet port 109 are connected with the liquid inlet pipe 104 and the liquid exhaust pipe 105, respectively, to thereby connect the unit container 106 with the base 101. Then, the cap portion 102 is slipped over the unit container 106 from above and is connected with the base 101. The shut-off valves 110 and 111 are pushed upward by the pipes 104 and 105 to open and form a path for the liquid to flow as shown in FIG. 14.

Figure 15:
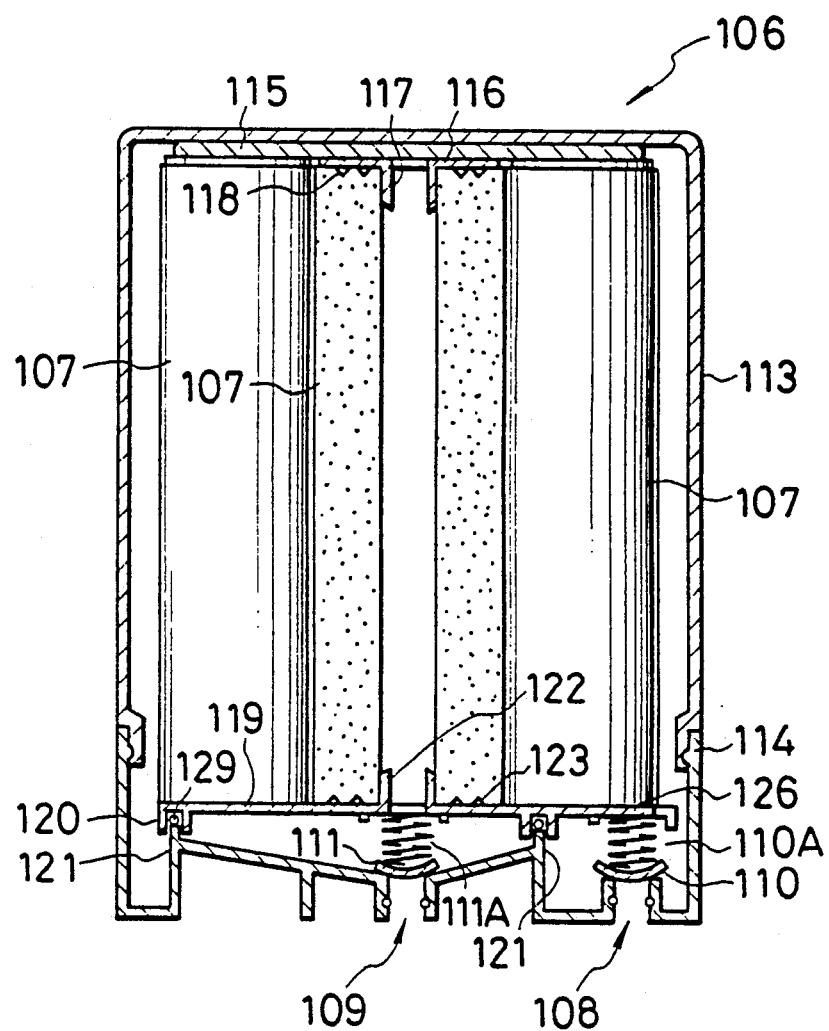
FIG. 15 is a vertical section showing another embodiment of the unit container according to this invention.

FIG. 15 is a vertical section showing another embodiment of the disposable unit container 106 according to this invention, which is preferably made of molded plastics, from an economical point of view. In this embodiments, there are provided seven cartridge filters 107. The unit container 106 itself is not resistant to high pressures, and is therefore protected by the sheath member. It is preferably made of a flexible material, such as a polyolefin based resin, rather than a rigid and brittle material. As shown in FIG. 15, the unit container 106 is disassembled into a body 113, which is an upper portion wherein the cartridge filters 107 are housed and a bottom member 114, which is a lower portion where the incoming original liquid is separated from the cleaned liquid and distributed.

Figure 16:
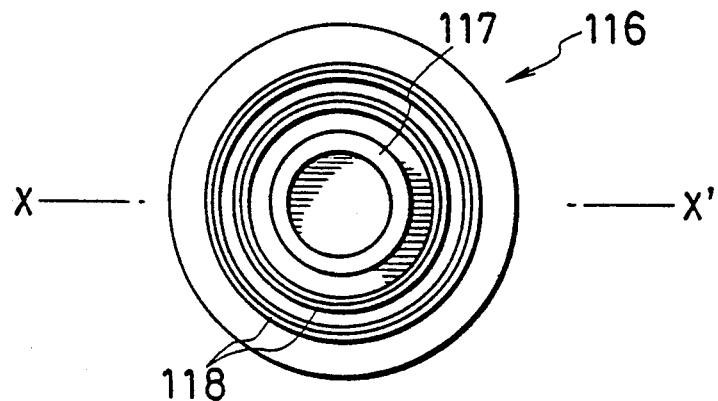
FIG. 16 is a bottom view showing an upper end cap according to this invention.
Figure 17:
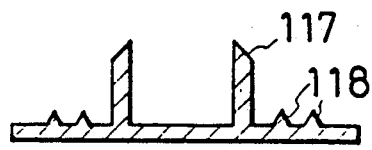
FIG. 17 is a sectional view along the line X—X' in FIG. 16.

One or more upper end caps 116 are attached to the upper surface of the body 113 via a cushioning member 115 to hold the upper ends of the cartridge filters 107 and to seal the same. FIG. 16 is a bottom view showing the upper end cap 116, and FIG. 17 is a sectional view thereof along line X—X'. On the lower face of a disc-like shielding plate are provided a cylindrical cartridge stopper 117, which fits into the inner hole of the cartridge filter 117, and plural sealing edges 118, ring-like projections concentric with the cartridge stopper 117. A bottom end cap 119 is placed firmly in a predetermined position by placing a belt-like engagement member 120, provided on the bottom face thereof, over the upper edge of a partition wall 121 inside the bottom member 114 of the unit container with an O-ring 129 for perfect sealing and supports the lower ends of the cartridge filters 107 with a cartridge stopper 122 and sealing edges 123 provided on the upper face of the bottom end cap 119. The cartridge stopper 117 and the sealing edges 118 on the upper end cap 116 correspond to the cartridge stopper 122 and the sealing edges 123 on the bottom end cap 119, respectively.

Figure 18:
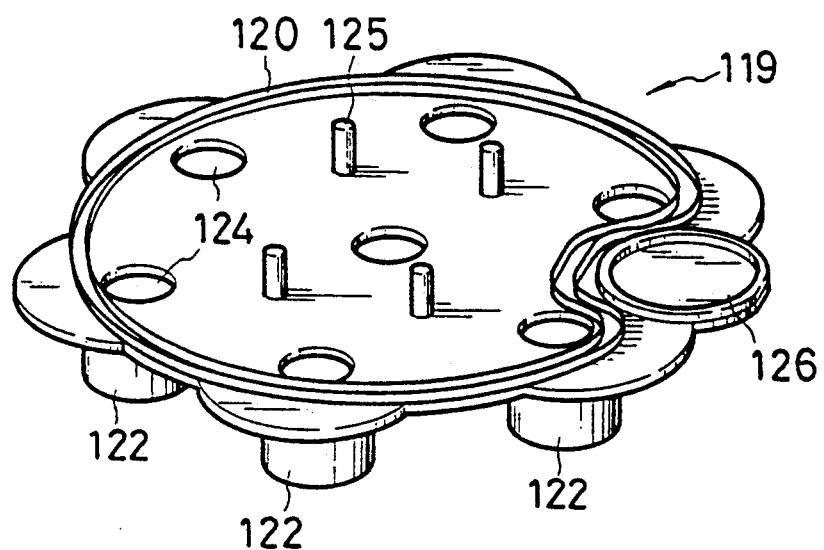
FIG. 18 is a perspective view showing the bottom face of an embodiment of the bottom end cap of this invention.
Figure 19:
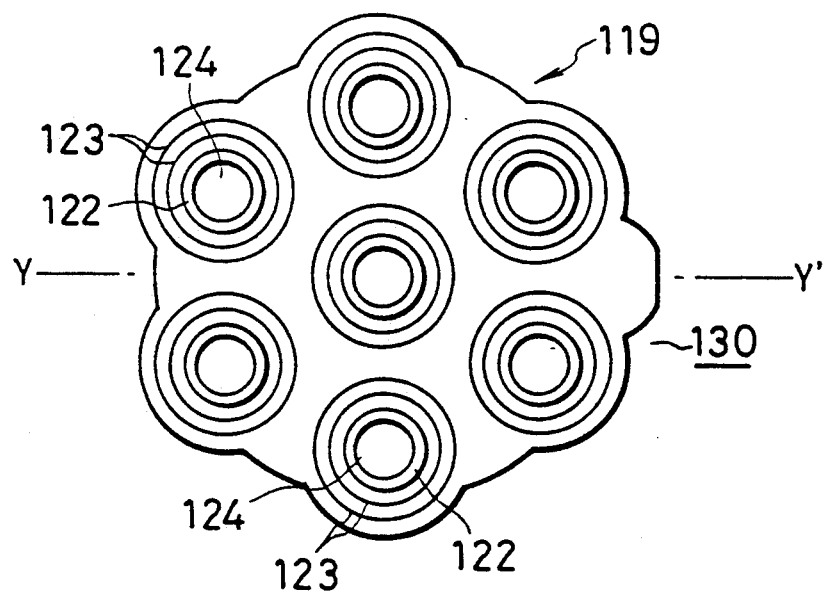
FIG. 19 is a plane view of the bottom end cap shown in FIG. 18.
Figure 20:
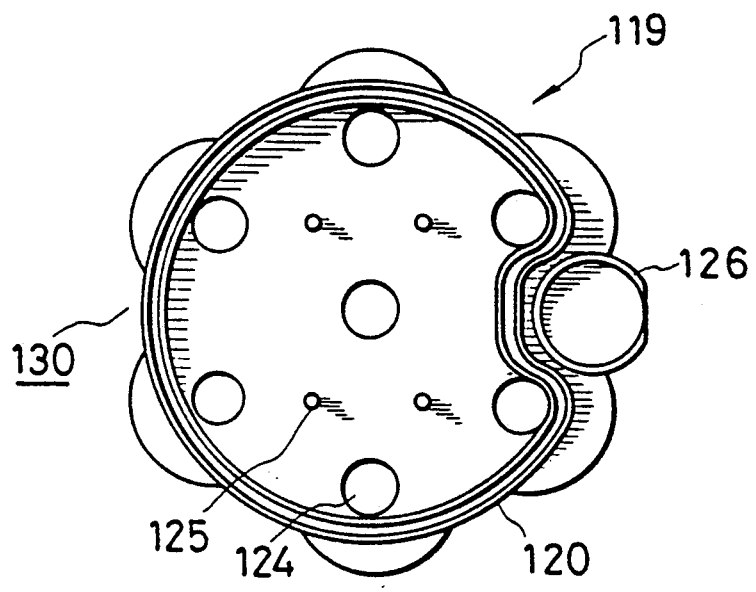
FIG. 20 is a bottom view of the bottom end cap in FIG. 18.
Figure 21:
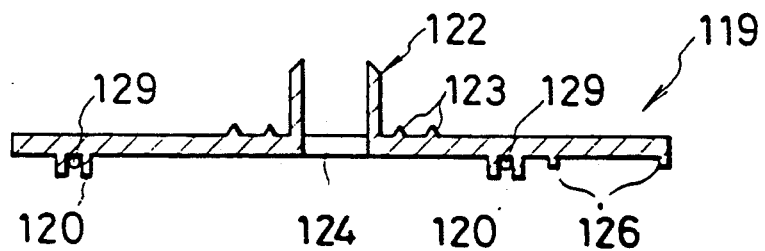
FIG. 21 is a sectional view along the line Y—Y' of FIG. 19.

FIGS. 18 through 21 show the bottom end cap 119 which supports the seven cartridge filters 107. FIG. 18 is a perspective view showing the bottom face thereof, FIG. 19 a plan view thereof, FIG. 20 a bottom view thereof, and FIG. 21 a cross section thereof along line Y—Y' of FIG. 19. As is obvious from FIGS. 18 through 20, the bottom end cap 119 is provided with seven holes 124 which communicate with the inner holes of the seven cartridge filters 107, and the engagement member 120 is formed like a loop to surround the holes 124. In this manner, as shown in FIG. 15, the bottom end cap 119 acts jointly with the partition wall 121 to separate the cleaned liquid (downstream side) from the original liquid (upstream side) and to guide it toward the liquid exhaust port 109. The outer circumference of the bottom end cap 119 is notched (130) at plural positions to smoothly let the original liquid pass therethrough. The original liquid incoming via the liquid inlet port 108 is guided from the portion outside of the partition wall 121 through the notches 130 to the outer faces of the cartridge filters 107 inside the body 113. FIGS. 18 and 20 show pins 125 for easily positioning the bottom end cap 119 in relation to the bottom member 114 when engaged therewith and a supporting plate 126 for supporting the fixed end of the shut-off valve 110.

The component parts of above mentioned unit container are assembled as follows. The upper edge of the partition wall 121 and the engagement member 120 are fitted together guided by the positioning pins 125, to fix the bottom member 114 with the bottom end cap 119 that can accommodate the predetermined number of cartridge filters 107 of a predetermined diameter. At the time of the engagement, the shut-off valves 110 and 111 are either placed on the bottom member 114 at predetermined portions or fixed at one end thereof to the supporting plate 126. Then, the cartridge filters 107 attached with the upper end cap 116 are fitted over the cartridge stoppers 122 on the bottom end cap 119, and the body 113 is slipped over the cartridge filters 107 from above, to thereby assemble the cartridge filters 107 with the bottom member 114 by pressing down the cartridge filters 107 via a cushioning member 115.

The double construction filter container according to this invention is simple in handling, and not time-consuming, as the disposable unit container thereof includes a filtration passage, and since the inside of the sheath portion, the portion of the container which is not disposable, is never exposed to the liquid, eliminating the need to be cleansed at the time of replacement. If a plurality of filtration lines are provided in parallel to each other and used alternately at the time of the replacement, it is not necessary to suspend the line at all, thereby reducing the manufacturing costs. The unit container per se is free of contamination from the liquid on the outside thereof. The filter container of this invention may be removed and transported while containing the liquid and filters sealed inside without a fear of contaminating the surroundings. Moreover, since all the component members of this filter container may be made of molded plastics, they are easily incinerated or disposed of.

As described in the foregoing, according to this invention the disposable unit container can be easily formed by assembling the component parts, and can be adapted to changes in filtering conditions by simply changing the upper end cap and the bottom end cap. This requires only the end caps to be stocked. Moreover, as the end caps are shaped as described above, the end faces of the cartridge filters are sealed firmly to facilitate the separation and distribution between the original liquid and the cleaned liquid.

The above filter container is a container with a double construction, comprising a durable member forming the outer case with a pressure-resistant structure, and a disposable inner unit container which is provided inside the outer case and houses one or more cartridge filters. When replacement of the filters is required, only the unit container is replaced. Although the above filter container is quite an effective means to solve the prior art problems, it still needs further improvements, as the dimensional stability of the cartridge filters is not quite satisfactory, and causes loosening or deformation in practice.

The filtering material of cartridge filters are generally made by winding core strands of cotton or synthetic fibers in a cylindrical form, by molding a nonwoven fabric in a cylindrical form and hardening the same with a thermosetting resin, or by molding a porous member of polyvinyl acetal resin in a cylindrical form and hardening the same with a thermosetting resin. All of them are highly sensitive in dimension to changes in temperature or humidity. They also tend to change in their length while kept in storage or in the process of transportation. Moreover, there is a recent tendency to increase the length of the filtering material in order to enhance thus filtration efficiency, and the dimensional changes are magnified. For example, if the polyvinyl acetal type resin, which is not dimensionally stable to changes in humidity is used, filters undergo dimensional changes of about 1-2%. If the whole length of the cartridge filter is 500 mm, the housing should tolerate dimensional changes as large as 5-10 mm.

This problem would be negligible if the cartridge filters were directly mounted on a pressure-resistant housing at the time of replacement, as is done in the prior art, because adjustment is possible by adequately tightening or giving an appropriate clearance. However, when unit containers are manufactured to incorporate the cartridge filters as disposable units, they may wait before use for an undeterminable length of time. The material for the unit containers, on the other hand, is preferably resin for a universal purpose, such as polyethylene or polypropylene, from an economical standpoint. Those resins are dimensionally more stable to changes in temperature or humidity conditions, and particularly in humidity, compared to that of the above cartridge filter. The difference tends to cause loosening, displacement or damage. This will often lead to leakage of the liquid contents, which is most undesirable in the filtration process.

In practice, the liquid to be filtered varies widely from those mainly composed of water to organic solvents, oils, or mixtures thereof, and the temperature also ranges in a wide scope. The cartridge filter in the housing reacts to such changes and often give rise to rapid swelling or contraction to resulting in dimensional fluctuations. In an extreme case, the swelling will cause instantaneous rupture at the joints of the containers. Therefore, absorption of deformation is an extremely important issue in the construction of the containers.

Figure 22:
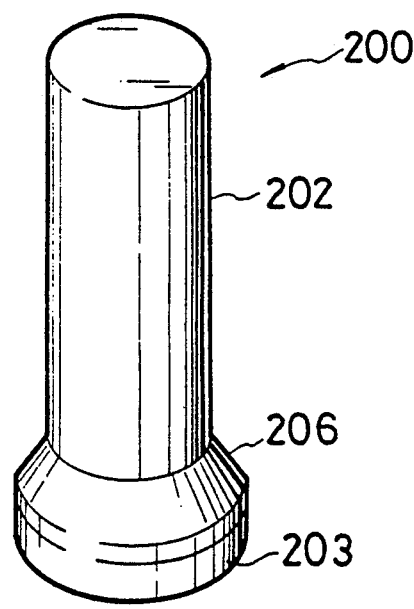
FIG. 22 is a perspective view showing the appearance of an embodiment of the unit container according to this invention.
Figure 23:
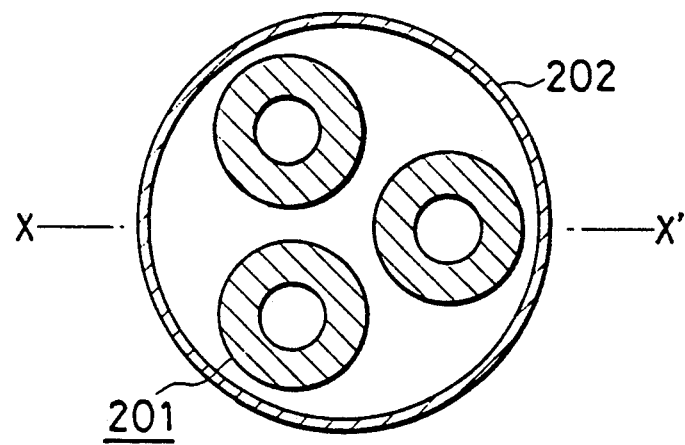
FIG. 23 is a plane section view at a portion showing filtering material.
Figure 24:
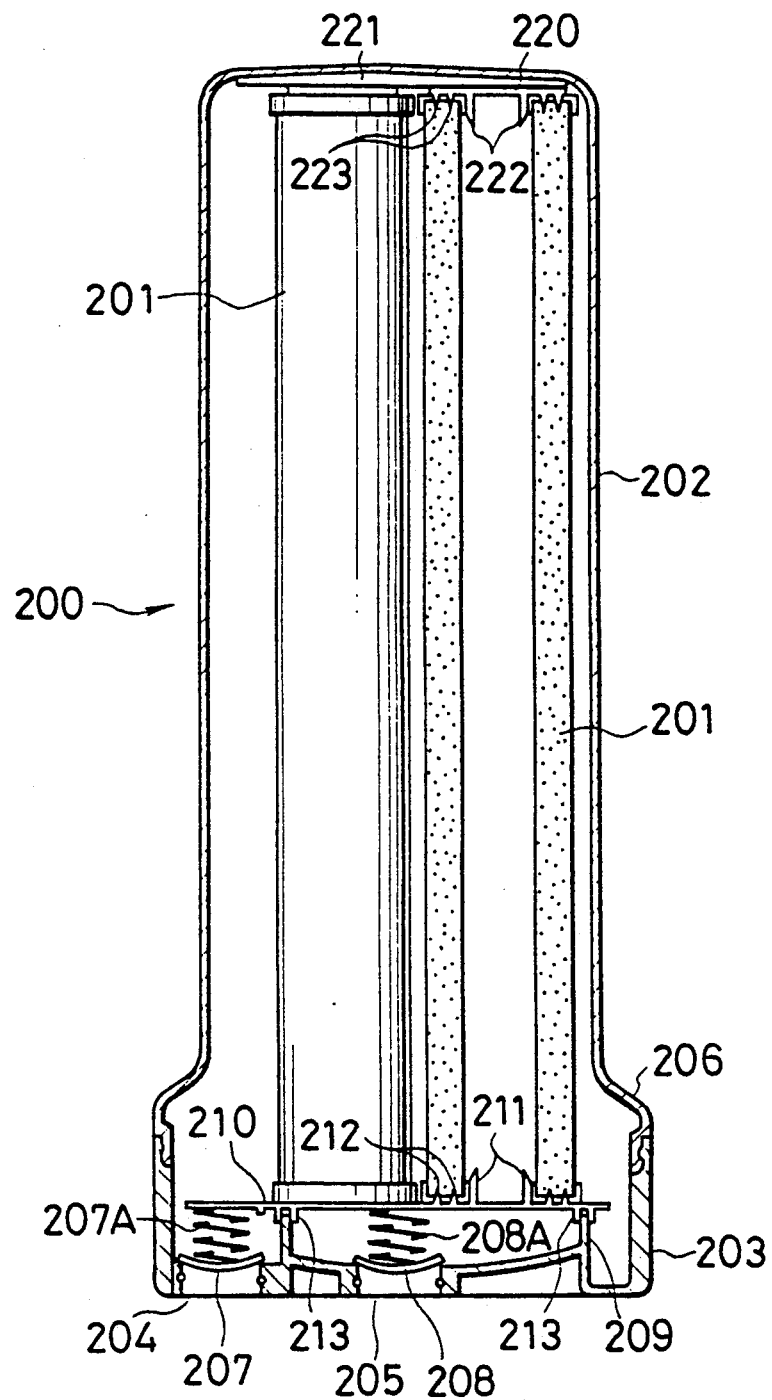
FIG. 24 is a vertical section along the line X—X' in FIG. 23.

FIG. 22 is a perspective view showing the appearance of an embodiment of a unit container 200 of a filter container according to this invention, FIG. 23 is a sectional view at a portion showing the cartridge filter and FIG. 24 is a vertical section along the line X—X' in FIG. 23. In this embodiment, three cartridge filters 201 are contained in the housing. A unit container 200 is made by molding plastics and can be divided into a body member 202 housing three cartridge filters 201 and a disc-like base member 203 having a liquid inlet port 204 and a liquid outlet port 205. The diameter of the body member 202 is smaller than that of the base member 203, except for the lower end, which is reverse-tapered conically to form a shoulder portion 206 with a diameter identical to that of the base member 203 so as to be joined with the base member 203. The shoulder portion 206 may be formed with plural conical surfaces of different angles so as to bulge outwardly.

At least one cartridge filter 201 is to be housed in the unit container 200, and is positioned at the lower end thereof by means of a bottom end cap 210 which has cylindrical cartridge stoppers 211 and is fixed on the base member 203. The upper end of the cartridge filter 201 is independently supported on the upper surface of the body via a cushioning member 221 by means of an upper end cap 220 provided for each cartridge filter 201. The base member 203 is provided with the liquid inlet port 204 and the liquid outlet port 205, each of which is normally closed with shut-off valves 207 and 208, respectively. The shut-off valves 207 and 208 each comprise a spherical or conical valve member and a coil spring 207A or 208A which is fixed at its one end on the concave surface of the valve member and is supported at the other end thereof on the bottom end cap 210. The shut-off valves the liquid inlet port 204 and the liquid outlet port 205 with the convex surface thereof with a resilience due to the energized coil springs 207A and 208A. The bottom end cap 210 has a construction as shown in FIGS. 18 to 21 and is provided with cartridge stoppers 211 and sealing edges 212. An engagement member 213 is provided on a back face of the bottom end cap 210 in order to engage with a partition wall 209 of the base member 203. Further, the upper end caps 220 are provided on the cartridge filters 201, and also have cartridge stoppers 222 and sealing edges 223 as described above.

Figure 25:
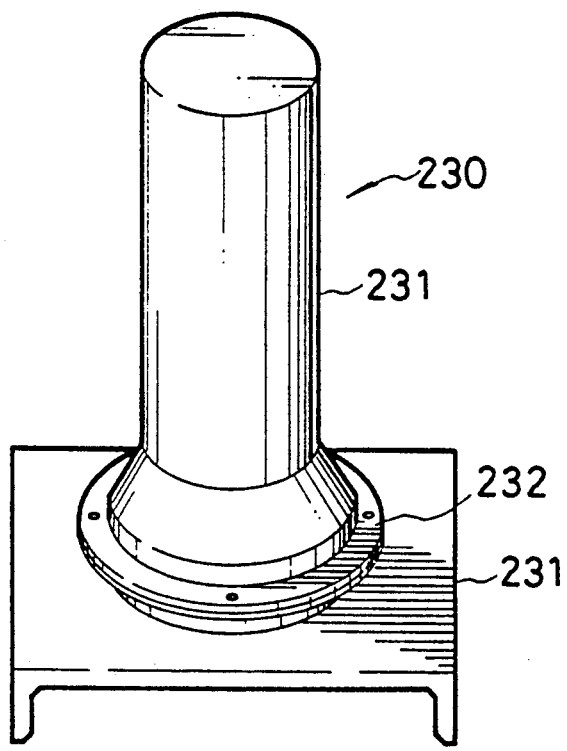
FIG. 25 is a perspective view showing a appearance of the sheath member according to this invention.
Figure 26:
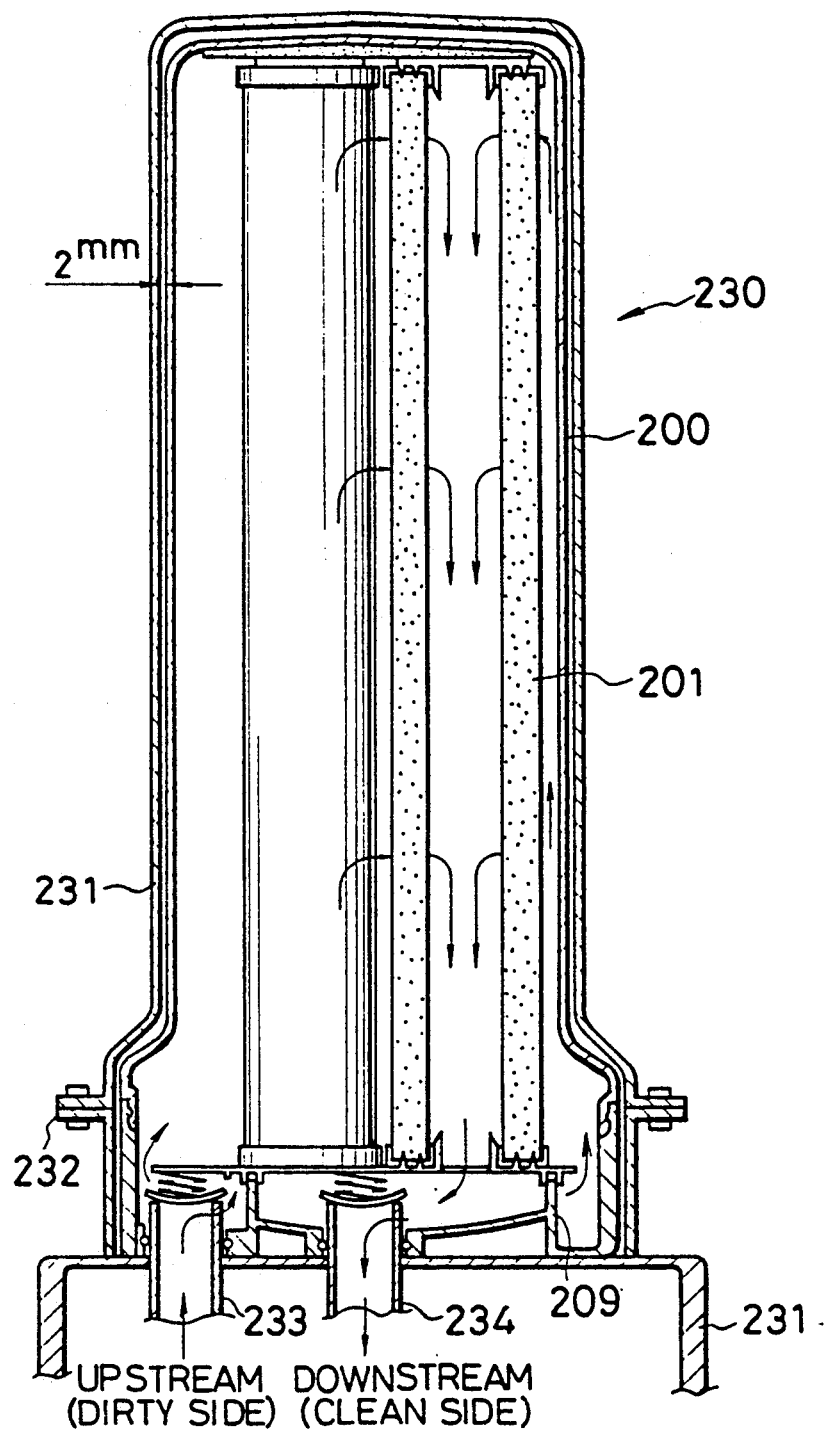
FIG. 26 is a vertical section showing a third embodiment of the filter container with double construction according to this invention.

FIG. 25 is a perspective view showing an embodiment of the filter container according to this invention, and FIG. 26 is a vertical section showing the unit container 200 mounted on the sheath member 231. The sheath member 231 is for permanent use, is made of metal with mechanical strength against pressure, and is divided into a base 231 and a cap portion. These are joined integrally with a coupling means 232 such as a flange, a screw or a clamp. The base 231 is provided with a liquid inlet pipe 233 and a liquid exhaust pipe 234, which are respectively connected directly to the filtering process line of the plant. When a unit container 200 is to be mounted, the cap portion of the sheath member 231 is removed from the base 231, and then the liquid inlet port 204 and the liquid outlet port 205 of the unit container 200 are respectively engaged with the liquid inlet pipe 233 and the liquid exhaust pipe 234 so as to install them on the base 231. Then, the cap portion is slipped over and joined with the base 1 by means of the coupling means 232.

The tip ends of the pipes 233 and 234 are notched in the form of a serration or crenelation, so that when the ends push up the shut-off valves 207 and 208 to be inserted into the ports 204 and 205, flow paths for the liquid are formed through the notches. The original liquid is, as shown with an arrow in FIG. 26, guided from the end of the pipe 233 to the area defined with the partition wall 209 and through the periphery of the bottom end cap 210 to reach the outer face of the cartridge filters 201. The liquid after filtration with the cartridge filters 201 is guided to pass through the inner holes of the cartridge filters to the holes opened in the bottom end cap 210 to enter the area encircled with the partition wall 209 of the base member 203, and exhausted from the end of the pipe 234.

If the cartridge filter 201 stretches in the longitudinal direction without restriction, it pushes the upper surface of the unit container 200 to disengage the body member 202 from the base member 203, resulting in the leakage of the liquid. The sheath member 231 is provided to limit such deformation, but if there is no clearance given between the members, there is no room for the unit container 200 to deform, and internal stress will be concentrated on the fixed support of the bottom end cap 210 and eventually destroy the structure of the unit container 200. This invention allows a clearance of about 5 mm between the unit container 200 and the sheath member 231 so that the shoulder portion 206 of the body member 202 may deform freely to absorb the internal stress caused by the swelling of the cartridge filters 201.

As stated in detail in the foregoing, the filter container with double construction according to this invention can effectively eliminate inconveniences encountered in the conventional unit container due to dimensional changes in the filtering material. This allows storage of stock unit containers for an extended period of time as well as eliminates problems which would otherwise arise when transporting the unit containers to areas where climate is extremely different. There is no need to modify the specifications and/or construction of the housing depending on the type of liquid or the object of filtration process, eliminating cumbersome steps. As an additional effect of this invention, the diameter of the body member is minimized to reduce dead space in the unit container for the undiluted liquid to reduce the loss of expensive liquid which would otherwise be caused at the time of replacement of the cartridge filter. This also contributes to reduction of the weight of the whole device and facilitates the replacement operation.

In addition to above, the shut-off valves disclosed in the embodiment can securely act as valves due to the curved shape of the valves, reduce risk of failure by virture of the simple structure thereof, and are quite suitable as a disposable element.

It should be understood that many modifications and adaptations of the invention will become apparent to those skilled in the art, and it is intended to encompass such obvious modifications and changes in the scope of the claims appended hereto.

What is claimed is:

1. A filter container, comprising:
a sheath member, comprising a base having a liquid inlet pipe and a liquid exhaust pipe, said base being directly connectable to pipe lines, and a cap, said cap being integrally attached to said base;
a disposable unit container housed in said sheath member;
cartridge filters, housed in the interior of said disposable unit container and having opposite ends;
end caps in said disposable unit container on said opposite ends of said cartridge filters;
said disposable unit container having a liquid inlet port and a liquid outlet port therein engaged with said liquid inlet pipe and said liquid outlet pipe, respectively; and
said liquid inlet port and said liquid outlet port being provided with respective shut-off valves, wherein a liquid flow path is opened by fitting said unit container on said base and closed by detaching said unit container from said base.

2. The filter container of claim 1, wherein said unit container has an exterior surface provided with a lateral groove.

3. The filter container of claim 1, wherein said opposite ends of said cartridge filters are upper and lower ends, and said end caps include upper end caps for respective said upper ends of said cartridge filters and a lower end cap supporting said lower ends of said cartridge filters, said lower end cap having a plurality of annular projections thereon for positioning said cartridge filters.

4. The filter container of claim 1, wherein:
said opposite ends of said cartridge filters include upper ends having at least one said end cap thereon;
said at least one end cap on said upper ends of said cartridge filters has an upper surface; and
a cushioning member is provided between the interior surface of said unit container and said upper surface of said at least one end cap.

5. The filter container of claim 1, wherein one of said shut-off valves comprises a valve disk supported by a plurality of legs connected to the side of said valve disk, said legs being guided for sliding movement by a plurality of guides.

6. The filter container of claim 1, wherein one of said shut-off valves comprises a valve disk having a convex surface portion engaging one of said ports and a coil spring fixed to a concave surface of said valve disk opposite said convex surface biasing said valve disk toward engagement with said port.

7. The filter container of claim 1, wherein said unit container has a hole at an upper portion thereof and a stopper engaging said hole from the interior of said unit container.

8. The filter container of claim 7, wherein said unit container has a top portion provided with a folding handle.

9. A filter container, comprising:
a sheath member;
a disposable unit container housed in said sheath member;
at least one cartridge filter disposed in said disposable unit container, said at least one cartridge filter having upper and lower ends with upper and lower end faces and an inner hole;
at least one upper end cap on said upper end of said at least one cartridge filter, said at least one upper end cap having an annular sealing edge for sealing said upper end face of said at least one cartridge filter; and
a bottom end cap having a cylindrical cartridge stopper for said at least one cartridge filter, said cylindrical cartridge stopper fitting into said inner hole of said at least one cartridge filter at said lower end face thereof, wherein said at least one cartridge filter is fixed in said unit container by being held between said at least one upper end cap and said bottom end cap;
wherein said sheath member comprises a cap and a base having liquid inlet and outlet pipes, said base being attached to said cap;
wherein a liquid inlet port and a liquid outlet port are provided in said unit container; and
wherein shut-off valves are provided in respective said liquid inlet and outlet ports for operation by said liquid inlet and outlet pipes of said base of said sheath member.

10. The filter container of claim 9, wherein
said unit container has a base portion with a liquid inlet port therein; and said bottom end cap is between said liquid inlet port and said at least one cartridge filter and has peripheral notches allowing liquid to flow from said liquid inlet port to said at least one cartridge filter therethrough.

11. The filter container of claim 9, wherein said unit container has a base portion, and said bottom end cap has a plurality of positioning pins for positioning said bottom end cap relative to said base portion.

12. The filter container of claim 9, wherein:
one of said shut-off valves comprises a valve disk supported by a plurality of legs connected to the side of said valve disk, said legs being guided for sliding movement by a plurality of guides.

13. The filter container of claim 9, wherein said bottom end cap has an endless engagement member for engaging a base portion of said unit container.

14. The filter container of claim 13, wherein said base portion of said unit container has a partition wall engaging said engagement member of said bottom end cap.

15. A filter container, comprising:
a sheath member comprising a cap and a base, said base having liquid inlet and outlet pipes, and said base being attached to said cap;
a disposable unit container housed in said sheath member, comprising a base disc member having a liquid inlet port, a liquid outlet port and shut-off valves for closing the respective said ports and for operation upon engagement by said liquid inlet and outlet pipes, and a cylindrical body member having an upper smaller diameter portion having a diameter smaller than said base disc member and a lower portion at the lower end of said cylindrical body member extending from said smaller diameter portion, defining a conical shoulder, and connecting said cylindrical body member to said base disc member; and
at least one cartridge filter in said disposable unit container, said at least one cartridge filter having an upper end that is sealed separately and independently from any other said cartridge filter in said disposable unit container.

16. The filter container of claim 15, wherein each said shut-off valve comprises a valve disk having a convex surface portion engaging a said port and a coil spring fixed to a concave surface of said valve disk opposite said convex surface biasing said valve disk toward engagement with said port.

17. A filter container, comprising:
a sheath comprising a base having a liquid inlet pipe and a liquid exhaust pipe, said base being directly connectable to pipe lines, and a cap, said cap being integrally attachable to said base;
a disposable unit container to be housed in said sheath, said disposable unit container having a liquid inlet port and a liquid outlet port therein, and further having shut-off valves therein in respective said ports for closing said ports and opening said ports upon engagement by said liquid inlet pipe and said liquid exhaust pipe;
at least one cartridge filter housed in said unit container, said at least one cartridge filter having opposite ends;
end caps in said disposable unit container engaging said opposite ends of said at least one cartridge filter.

18. The filter container of claim 17, wherein said unit container has a bottom portion with said ports therein, one of said end caps is a bottom end cap supporting the lower end of said at least one cartridge filter, said bottom end cap defines an outlet chamber above said liquid outlet port and communicates an interior portion of said at least one cartridge filter with said outlet chamber, and said liquid inlet port communicates with an exterior portion of said at least one cartridge filter.

19. The filter container of claim 17, wherein said unit container comprises a base portion and an upper portion separably connected to each other, said base portion having said ports therein.

20. The filter container of claim 17, wherein one of said end caps is a bottom end cap supporting the lower end of said at least one cartridge filter, said bottom end cap being located above said inlet and outlet ports and defining flow paths to and from said at least one cartridge filter and between said inlet and outlet ports.

21. The filter container of claim 20, wherein said shut-off valves are disposed below said bottom end cap inside of said ports.

22. The filter container of claim 20, wherein said shut-off valves are biased downwardly toward said ports from said bottom end cap.

23. The filter container of claim 20, wherein said at least one cartridge filter has an inner hole extending therethrough, and wherein said bottom end cap has a cylindrical cartridge stopper for said at least one cartridge filter engaged with said inner hole of said at least one cartridge filter, said cartridge stopper defining a hole through said bottom end cap and communicating said inner hole with said liquid outlet port.

24. The filter container of claim 23, wherein annular sealing ridges are provided about said cylindrical cartridge stopper for sealing the lower end of the said at least one cartridge filter.

* * * * *